US010521753B2

(12) United States Patent
Latzina et al.

(10) Patent No.: US 10,521,753 B2
(45) Date of Patent: Dec. 31, 2019

(54) USAGE DESCRIPTION LANGUAGE

(71) Applicant: SAP SE, Walldorf (DE)

(72) Inventors: Markus Latzina, Wiesenbach (DE); Abhay Tiple, St. Leon-Rot (DE)

(73) Assignee: SAP SE, Walldorf (DE)

( * ) Notice: Subject to any disclaimer, the term of this patent is extended or adjusted under 35 U.S.C. 154(b) by 1162 days.

(21) Appl. No.: 14/049,522

(22) Filed: Oct. 9, 2013

(65) Prior Publication Data

US 2015/0100905 A1    Apr. 9, 2015

(51) Int. Cl.
*G06F 3/0484* (2013.01)
*G06Q 10/06* (2012.01)

(52) U.S. Cl.
CPC .................................. *G06Q 10/067* (2013.01)

(58) Field of Classification Search
CPC ........ G06F 3/0484; G06F 15/18; G06F 17/30; G06Q 10/067; G06Q 10/063
See application file for complete search history.

(56) References Cited

U.S. PATENT DOCUMENTS

| 5,642,511 | A | 6/1997 | Chow et al. |
| 5,870,719 | A | 2/1999 | Maritzen et al. |
| 6,327,551 | B1 * | 12/2001 | Peterson .................... G06F 8/10 700/97 |
| 6,587,822 | B2 * | 7/2003 | Brown ................... H04M 3/493 704/251 |
| 6,626,957 | B1 * | 9/2003 | Lippert ............... G06F 17/2247 707/999.101 |
| 6,636,831 | B1 * | 10/2003 | Profit, Jr. ................ G10L 15/26 704/270 |
| 6,950,831 | B2 | 9/2005 | Haley |
| 7,685,252 | B1 * | 3/2010 | Maes ..................... G06F 9/4443 709/217 |
| 7,827,496 | B2 | 11/2010 | Dorn et al. |
| 8,131,668 | B2 | 3/2012 | Beringer et al. |
| 8,296,665 | B2 | 10/2012 | Stienhans et al. |
| 2002/0062475 | A1 * | 5/2002 | Iborra ....................... G06F 8/30 717/108 |
| 2003/0088543 | A1 * | 5/2003 | Skeen ..................... G06F 17/22 |
| 2004/0083199 | A1 * | 4/2004 | Govindugari ..... G06F 17/30303 |
| 2004/0148586 | A1 * | 7/2004 | Gilboa ....................... G06F 8/38 717/108 |
| 2004/0153992 | A1 * | 8/2004 | Molina-Moreno ....... G06F 8/35 717/105 |
| 2004/0199572 | A1 * | 10/2004 | Hunt .................... G06F 9/4492 709/201 |

(Continued)

OTHER PUBLICATIONS

Markus Latzina et al., Transformative User Experience-Beyond Packaged Design, Mar.-+Apr. 2012, DOI, p. 30-33 (Year: 2012).*

*Primary Examiner* — Phenuel S Salomon
(74) *Attorney, Agent, or Firm* — Mintz, Levin, Cohn, Ferris, Glovsky and Popeo, P.C.

(57) ABSTRACT

A computer-implemented method includes incorporating a usage model in a business application hosted on a computing device. The usage model describes anticipated usages of the business application by a user and is specified using a formal machine readable language. The method includes providing an adapter configured to automatically translate the usage model in the business application to a UI profile consistent with a UI technology available on the computing device on which the business application is hosted.

18 Claims, 3 Drawing Sheets

(56) References Cited

U.S. PATENT DOCUMENTS

| | | | |
|---|---|---|---|
| 2004/0223009 A1* | 11/2004 | Szladovics | G06F 9/4443 715/760 |
| 2005/0273759 A1* | 12/2005 | Lucassen | G06F 8/38 717/105 |
| 2006/0025987 A1* | 2/2006 | Baisley | G06F 17/271 704/4 |
| 2007/0150822 A1 | 6/2007 | Mansour et al. | |
| 2007/0204078 A1* | 8/2007 | Boccon-Gibod | G06F 21/10 710/54 |
| 2007/0250811 A1* | 10/2007 | Ahs | G06F 8/41 717/114 |
| 2008/0004725 A1 | 1/2008 | Wacker | |
| 2008/0288877 A1* | 11/2008 | Latzina | G06F 9/4443 715/762 |
| 2009/0106456 A1* | 4/2009 | Muller | G06F 9/545 710/5 |
| 2009/0113380 A1* | 4/2009 | Ploesser | G06F 8/20 717/104 |
| 2009/0249296 A1 | 10/2009 | Haenel et al. | |
| 2010/0011338 A1* | 1/2010 | Lewis | G06F 8/10 717/105 |
| 2010/0169977 A1* | 7/2010 | Dasher | G06Q 20/3674 726/26 |
| 2010/0229150 A1* | 9/2010 | Stone | G06F 8/00 717/104 |
| 2010/0251129 A1* | 9/2010 | Beringer | G06F 9/451 715/738 |
| 2011/0029947 A1* | 2/2011 | Markovic | G06Q 10/10 717/102 |
| 2011/0167403 A1* | 7/2011 | French | G06F 8/38 717/105 |
| 2011/0289141 A1* | 11/2011 | Pletter | G06F 17/30575 709/203 |
| 2011/0302217 A1 | 12/2011 | Heidasch | |
| 2012/0030238 A1* | 2/2012 | DeLuca | G06Q 10/06 707/777 |
| 2012/0158556 A1 | 6/2012 | Said et al. | |
| 2012/0198279 A1* | 8/2012 | Schroeder | G06F 11/2294 714/32 |
| 2012/0198364 A1 | 8/2012 | Bornheimer et al. | |
| 2012/0246613 A1* | 9/2012 | Shukla | G06F 8/24 717/105 |
| 2012/0260237 A1* | 10/2012 | Duddles | G06F 8/10 717/139 |
| 2013/0019002 A1* | 1/2013 | Heileman | G06F 21/10 709/223 |
| 2013/0091448 A1 | 4/2013 | Latzina et al. | |
| 2013/0125053 A1 | 5/2013 | Brunswig et al. | |
| 2013/0191249 A1* | 7/2013 | Schwartz | G06Q 30/02 705/26.61 |
| 2013/0226671 A1* | 8/2013 | Pechanec | G06Q 10/0633 705/7.36 |
| 2014/0075411 A1* | 3/2014 | Diep | G06F 8/34 717/109 |
| 2014/0317596 A1* | 10/2014 | Bouris | G06F 9/44536 717/106 |

\* cited by examiner

USAGE DESCRIPTION LANGUAGE

BACKGROUND

A user interface (UI) is a means by which a person can interact with a computer software application or hardware device. A good user interface may provide a "user-friendly" experience, allowing the user to interact with the software or hardware in a natural and intuitive way.

Business software or a business application is any software or set of computer programs that are used by business users to perform various business functions. The business application may be used to increase productivity, to measure productivity and to perform business functions accurately. A business application may be developed based on business objects and business process models to carryout the various business tasks or work flows needed to accomplish the intended objectives or functions of the business. User tasks or interactions ("usages") are often not considered or modeled for the development of the business application. User tasks may be considered or recognized only post facto in the context of integration of the business application with established or standardized UI technology platforms.

Available UI notations (for example, in business application code) typically presuppose a specific UI technology, or, at least a particular user paradigm. Due to their uniformity, these available UI notations they do not lend themselves to accommodate variations or "dialects".

User interactions ("usages") may not be directly derived from either business process or business object models of a business application because these do not take into account usage needs or usage constraints. For the purpose of a generating UI for a software application, standard or common UI notations may be used for physical or technical entities (e.g., drop down boxes, menu bars, radio buttons, etc.,) in the UI. Concepts of user tasks may be intermingled with realizations of the physical entities in the UI. However, the user tasks merely serve as labels to denote UI elements and are not considered independent of reference to the UI elements in the context of the development of the business application itself. Common UI notations do not include the analysis needed for preparing a specific usage model. The common UI notations may be over specific and may not allow under specification or fuzziness of UI elements, which may be useful in flexible UI design.

Further, established or standardized UI platforms used by business applications support only a very limited scope of end-user UI technologies. These may be difficult and costly to modify to accommodate the changing needs of users or to incorporate new developments in UI technologies. UI elements or features may be technology specific and not interchangeable from one technology platform to another technology. For example, a JavaScript platform may by default support "drop-and-drag" and resize features in an UI, which features are not available in other platforms (e.g., in Web Dynpro). Thus, a business application may not be able to interchangeably use UIs based on different platforms without extensive or expensive recoding.

Consideration is now being given to use usage models in business application development to allow flexible generation of user interfaces and improved user interaction experience.

SUMMARY

In a general aspect, a computer system includes a memory and a processor configured to run a business application. At least one anticipated usage of the business application by a user is represented by a transformational vector. The business application includes a usage model describing the at least one anticipated usage of the business application by the user. The usage model is specified in a machine readable language and is stored at least partially in the memory.

In an aspect, the usage model specification in the machine readable language excludes references to user interface (UI) components or elements of a computing platform on which the business application is hosted and is agnostic to a UI technology of the computing platform on which the business application is hosted.

In a further aspect, the computer system includes an adapter configured to automatically translate or convert the usages described in the usage model in the business application into a UI instance that is specific to the UI technology of the computing platform on which the business application is hosted. The adapter is customized for the UI technology of the computing platform on which the business application is hosted.

In a general aspect, a computer-implemented method includes incorporating a usage model in a business application hosted on a computing device and specifying the usage model using a formal machine readable language. The usage model describes anticipated usages of the business application by a user.

In an aspect, specifying the usage model using a formal machine readable language includes defining usage formally in terms of a transformational vector and relating the anticipated usages to business objects and/or business process models underlying the business application.

In a further aspect, specifying the usage model using a formal machine readable language includes excluding UI notations from the usage model and incorporating the usage model in the business application includes incorporating a usage model that is agnostic to the user interface technology available on the computing device on which the business application is hosted.

In another aspect, the method includes providing an adapter configured to automatically translate the usage model in the business application to a UI profile consistent with a UI technology available on the computing device on which the business application is hosted. The adapter is customized for the UI technology available on the computing device on which the business application is hosted.

In a further aspect, the method include using the adapter to generate a UI instance on a frontend of the business application, wherein the UI instance uses UI components or elements that are specifically supported by computing device on which the business application is hosted.

In a general aspect, a non-transitory computer readable medium includes instructions capable of being executed on a processor. The instructions when executed allow a computing device to create a UI instance on a frontend of a business application hosted on a computing device. The business application includes a usage model specified in a machine-readable Usage Description Language (UDL). The usage model specifies anticipated usage of the business application by a user and is agnostic to a UI technology of the computing device on which the business application is hosted. The instructions when executed translate the usage model in the business application to a UI profile, which includes UI components that are specifically supported by the computing device on which the business application is hosted. The UI instance includes UI components or elements that are specifically supported by the computing device on which the business application is hosted.

The details of one or more implementations are set forth in the accompanying drawings and the description below. Further features of the disclosed subject matter, its nature and various advantages will be more apparent from the accompanying drawings the following detailed description, and the claims.

DETAILED DESCRIPTION

A usage model, which describes what a user may want to do or accomplish with a business application or how the user may want to interact with the business application, is incorporated in the development of a business application, in accordance with the principles of the disclosure herein. The usage model may be considered in the development of a business application in addition to or in conjunction with one or more business objects and business process models that describe the business tasks and work flows solved by the business application. The business application may be hosted on one or more of a diverse variety of platforms or devices (e.g., smartphones, servers, desktops, laptops, PDAs, etc.), which may have or support correspondingly diverse display, I/O, and user interface (UI) technologies. Further, in accordance with the principles of the disclosure herein, incorporating the usage model in the development of the business application allows generation of "user-friendly" or "user-centric" user interfaces (UIs) for the business application on diverse platforms or devices (e.g., smartphones, servers, desktops, laptops, PDAs, etc.) on which the business application may be hosted.

Usages of a business application from a user's perspective may include sundry actions (depending on the business application) that the user may want to take or accomplish, for example, "make a call to a customer," "sort the data table by price," "book an airline ticket," etc. A concept of usage may be formally defined for the usage model used in the business application. The usage model may be specified using a formal language (e.g., "Usage Description Language" (UDL)) to describe the usages. For example, a usage may be formally defined in terms of a transformational vector as follows:

Usage: Initial Task State+Usage Action→Final Task State

Usage Action:={Action$_{UDL}$+Usage Object}

The usage model specification may further include "usage constraints" i.e. parameters that further specify or limit the usages defined in the usage model. For example, in a case where a defined usage is "make a telephone call," a usage constraint may be "the performance must be conducted hand-free." Further, for example, a usage constraint may be "no other usage must precede this selected usage."

An example UDL may support modeling at various levels of specification. The example UDL may provide distinctive "usage" notations for specifying the usage model. The distinctive usage notations may be distinct from notations (e.g., UI notations) that are used for specifying other models (e.g., UI models, BPM, etc.) that may be included in or used for the business application. The distinctiveness of the UDL notation may help developers of the business application avoid inadvertently or otherwise mixing up or confusing usage concepts underlying the usage model with UI concepts underlying the UI models. Further, the example UDL may provide placeholders for linkages to other notations (e.g., BO or BPM notations).

The UDL and its usage notations for specifying the usage model may be independent of the UI technology details of the computing device or platform types on which the business application may be hosted. Thus, the usage model for the business application may be generically specified in UDL as a single or same usage model specification across diverse computing device or host platform types. Further, the UDL used to specify the usage model may be a machine readable language, which may allow the usage model that is based on usage concepts to be automatically computer processed or converted (using, for example, a UDL-UI adapter) into UI concepts for technical implementation of the usage model as a user interface for the business application on a particular computing device or platform hosting the business application.

The UDL-UI adapter, which may be UI technology- or platform-specific, may be coded to convert or translate the machine readable UDL usage notations in the usage model into UI notations appropriate for the UI technology of the particular computing device or platform on which the business application is hosted. The UDL-UI adapter may process the UI notations of the usage model as input to generate a UI for the business application specific to the particular computing device or platform on which the business application is hosted.

It will be understood that an appropriate UI technology- or platform-specific UDL-UI adapter may be coded and made available for each of the diverse computing device or host platform types on which the business application may be expected to be hosted.

Figure 1:
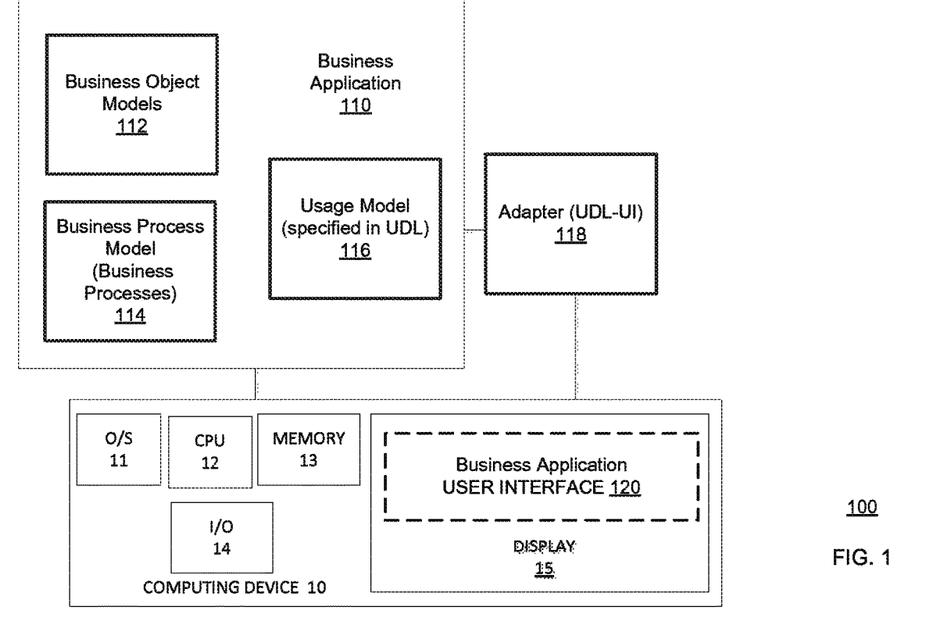
FIG. 1 is a block diagram illustration of an example computer-based system hosting a business application with a "user-centric" user interface (UI), in accordance with principles of the disclosure herein.

FIG. 1 shows an example computer-based system 100 hosting a business application 110, which is configured to generate a user-friendly or user-centric UI 120, in accordance with principles of the disclosure herein.

System 100 includes business application 110, which may be based on business object models 112, a business process model 114 and a usage model 116. System 110 may further include a UDL-UI adapter 118 and a user interface 120. For convenience in description herein, UDL-UI adapter 118 and user interface 120 are shown as modules separate from business application 110, but it will be understood that one or both of them may be viewed as part of business application 110 in appropriate contexts.

In system 100, business application 110 and UDL-UI adapter 118 may be hosted on one or more standalone or networked physical or virtual computing machines. FIG. 1 shows, for example, business application 110 and UDL-UI adapter 118 hosted on a computing device 10 (e.g., a desktop computer, a mainframe computer, a personal computer, a mobile computing device, a laptop, a tablet, or a smart phone), which may be available to a user. Computing device 10, which includes an O/S 11, a CPU 12, a memory 13, and I/O 14, may further include or be coupled to a display 15.

Business application 110 may be configured to manage a particular business process or workflow (e.g., business process model 114) of an organization. Business application 110 may be linked, for example, via Internet or intranet connections, to data sources on the web (e.g., worldwide and/or enterprise webs) and/or or other computer systems of the organization (e.g., e-mail systems, human resources systems, material systems, operations, etc.) (not shown) that may have information relevant to the implementation of business process model 114.

In system 100, business application 110 may be coupled via ULD-UI adapter 118 to an interactive user interface (e.g., UI 120), which may be presented to a user, for example, on display 15 in computer 10. Usage concepts or elements of usage model 116 in business application 110, which may be specified in machine readable language (i.e. UDL), may be converted by ULD-UI adapter 118 into UI concepts and elements that are specifically supported by computer 10.

Different types of computer 10 (e.g., a desktop computer, a mainframe computer, a personal computer, a mobile computing device, a laptop, a tablet, or a smart phone) may have or support different UI technologies (e.g., graphical user interfaces (GUI), voice user interface (VUI), telephone user interface (TUI), etc.) and different UI components. It will be understood that ULD-UI adapter 118 may be customized for generating UI 120 appropriate to the UI technology and components supported by the computing platform (e.g., computer 10) hosting business application 110. Thus, for example, ULD-UI adapters 118 for a smartphone with a touchscreen or voice recognition and a desktop computer with a mouse and keyboard may be different and may be configured to generate different UI 120 instances as may be appropriate for the different smartphone and desktop computer devices.

Moreover, although computer 10 is illustrated in the example of FIG. 1 as a single computer, it may be understood that computer 10 may represent two or more computers in communication with one another. Therefore, it will also be appreciated that any two or more components 110-120 of system 100 may similarly be executed using some or all of the two or more computing devices in communication with one another. Conversely, it also may be appreciated that various components illustrated as being external to computer 10 may actually be implemented therewith.

EXAMPLE SCENARIO

An example business application 110 may be a "Leave Request" application developed to manage, for example, vacation or holiday times of employees of a business. The Leave Request application may be developed to accomplish tasks of a business process for handling leave requests from individual employees. An example business process model for the leave request process may include the following business tasks or workflow (e.g., in Business Process Model 114):

1) Notify employee of total available days
2) Accept from employee valid contiguous calendar dates for leave
3) Notify employee of validation result
4) Book leave request when prompted by employee To accomplish these tasks, the Leave Request application may be coded to process or act on leave-related Business Object Models 112, for example, an "EmployeeLeaveAccount" object and a "CalendarDays" object. The EmployeeLeaveAccount object may have attributes including, for example, "TotalAvailableDays" and "AlreadyBookedDays." The CalendarDays object may include the attribute "ValidCalendarDays". The Leave Request application may, for example, execute actions "ValidateCalendarDays (calendar days) and BookLeave (calendar days) to process a leave request of an individual employee/user.

A usage of the Leave Request application by the user may involve the user wanting to submit a leave request and getting the leave request approved. A usage model may include or relate to usage concepts enabling the user to create a leave request, notifying the user of a total number of leave days available to the user, and accepting proposed leave dates from the user. The usage model may further include notifying the user if the proposed leave dates are valid leave dates, and receiving a user prompt booking the validated leave dates.

A usage model (e.g., usage model 116) for generating a user-friendly UI instance for the Leave Request application may be as specified by the following example machine readable UDL script:

```
begin_usage_scenario(
    {EN, 'Create Leave Request'}
    {DE, 'Urlaubsantrag erstellen'}
) {
notify (EmployeeLeaveAccount.TotalAvailableDays(Text: (
    {EN, 'Total available leaves'}
    {DE, 'Gesamt Urlaubskonto'}
)));
accept(leave dates(Text:(
    {EN, 'Leave dates'}
    {DE, 'Urlaubstagen'}
))
notify
(Calenndardays.ValidateCalendarDays
(leave_dates) .messages);
receive (user-
prompt(EmployeeLeaveAccount.BookLeave(leave_dates))
}end_usage_scenario (MODE.CLOSE_INTERACTION)
```

Figure 2:
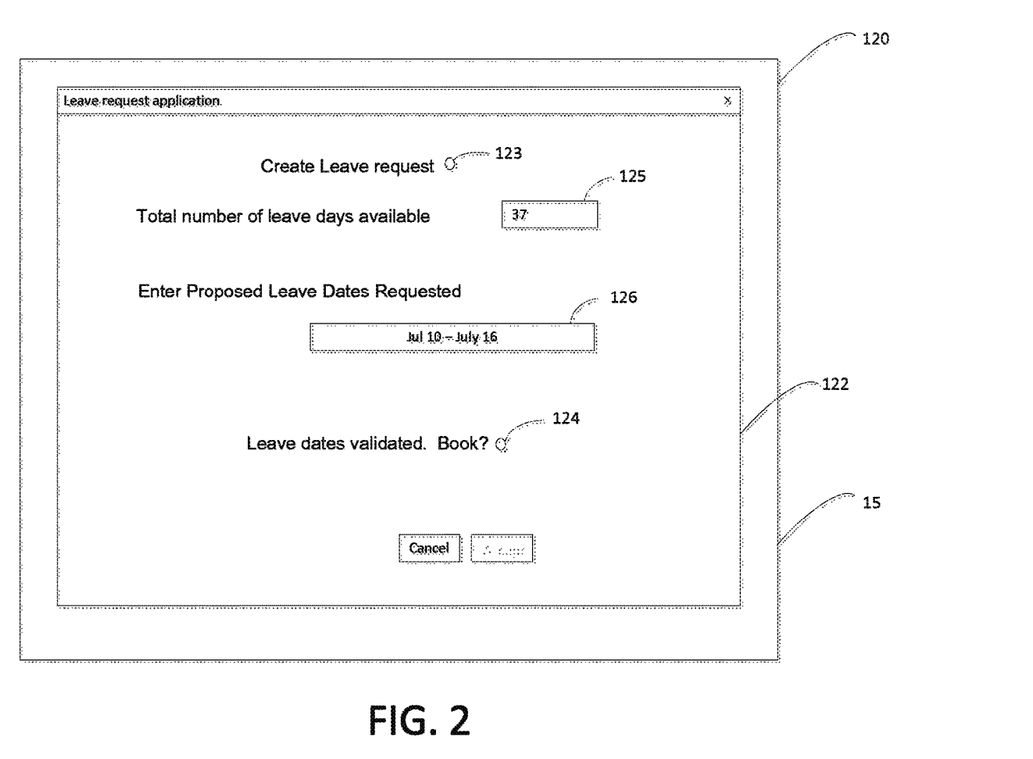
FIG. 2 is a schematic illustration of an example UI instance, in accordance with principles of the disclosure herein.

UDL-UI adapter 118 may be configured to automatically translate or convert the usages described in the foregoing usage model 116 into a UI instance 120, which is specific to the UI technology of computer 10/display 15. Such an UI instance 120 (FIG. 2) may, for example, be displayed in a pop window 122 on display 15. UDL-UI adapter 118 may relate usages in usage model 116 to specific UI elements available on computer 10. For example, pop up window 122 may include UI elements such as radio buttons 123 and 124, which the user can activate to create the leave request and to book leave, respectively. Pop up window 122 may also include UI elements such as text fields 125 and 126 for display of the total number of leave dates available to the user and for entry of proposed leave dates by the user, respectively.

In general (not limited to the example scenario described above) the UDL used for usage model specification may support modeling at various levels of specification and may additionally allow integration of "informal" artefacts (e.g. annotations, sketches, mock ups, diagrams, conversations) with the formal usage notation in the specification of the usage model.

The UDL specification of the usage model may relate the usage concepts in the usage model to business objects and business process models in the business application. However, the UDL specification of the usage model may not directly relate to or contain direct references to specific UI elements at a frontend of the business application. In particular, the usage model and its UDL specification may be agnostic to the technology of the UI platform at the frontend of the business application. Generation of a specific frontend UI instance (e.g., UI 120) for business application 110 may be mediated by a UDL-UI adapter layer (e.g., UDL-UI adapter 118). The adapter layer may be configured to map of transform the UDL-specified usage models into UI instances. The adapter layer may be further configured to express UI profiles in technical terms for automated instantiation of the UIs.

The UDL language developed for model specification may not be uniformly standard for all situations but may have language varieties which are tuned or tailored toward specific usage paradigms and/or usage contexts. For example, a UDL variant may be developed for low frequency usage by untrained users of an automatic teller machine (ATM). Another UDL variant may be developed to support usages/users in an environment involving manual labor (e.g., forklift operators in a warehouse). Another UDL variant may be developed to support usages/users (e.g. research lab professionals, chemical research assistants) in technical or research environments. Another UDL variant may be tailored toward usages by users (e.g. creative marketing personnel, copy writers, authors, etc.) who may interact with ideational artefacts (e.g., ideas, concepts, stories), which may not represent or refer to physical artefacts.

The UDL used for specifying the usage model may maximize a natural work style. Users of a UDL modeling tool may not have to formally learn UDL or UDL notations as a new language. Boot strapping, scaffolding and similar means may be employed by UDL modelers to reuse or transfer learning from other situations. UDL modelers may be able to add UDL notations as a markup to existing business object models, business process models or UI instances. In an example, a UDL modeler may be able to draw a sketch of a UI instance, create an interactive mockup and retroactively "reconstruct" or "convert" it into UDL notation. In another example, a UDL modeler may tentatively extend usage scenarios. A UDL modeler may create a UI instance or prototype in for a particular UI type or technology (e.g., telephone use interface (TUI), graphical user interface (GUI), voice user interface (VUI), etc.). The user may specify the UI instance or prototype in UI notation to create a usage model, and then use the usage model in combination with the UDL-UI adapter to have a UI generated in another UI technology.

Figure 3:
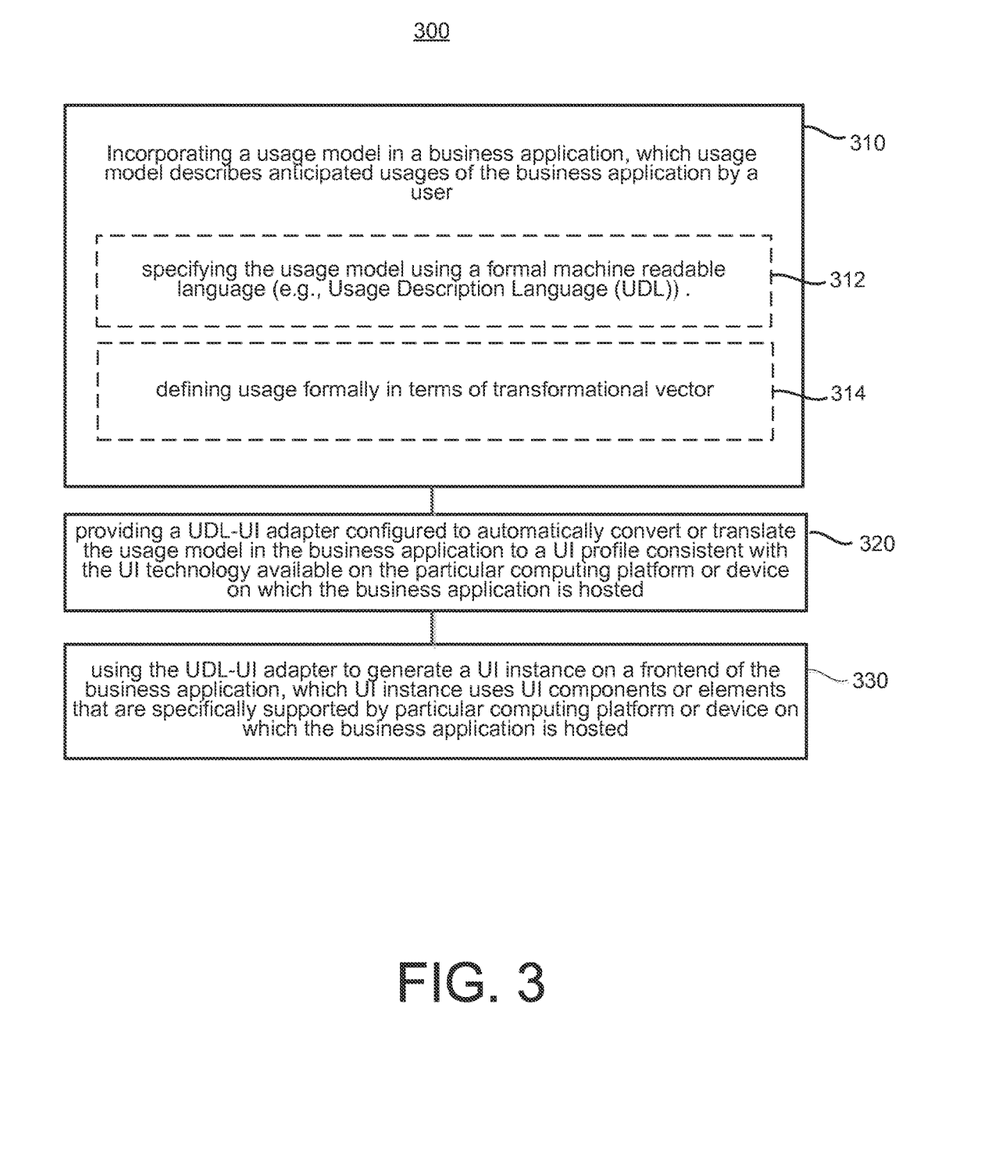
FIG. 3 is a flow diagram illustration of an example method for providing a user-centric UI at a frontend of a business application, in accordance with principles of the disclosure herein.

FIG. 3 shows an example computer-implemented method 300 for executing instructions stored on a non-transitory computer readable storage medium. Method 300 may be used for generating "user-friendly" or "user-centric" user interfaces (UIs) at a front end of a business application, which may be hosted on diverse computing platforms or devices. The UI instances generated by method 300 may be customized or tailored to the UI technology of the particular computing platform or device on which the business application is hosted.

Method 300 may include incorporating a usage model in the business application (310). The usage model may describe potential or anticipated usages of the business application by a user. Incorporating the usage model in the business application 310 may include specifying the usage model in a formal machine readable language (e.g., Usage Description Language (UDL)) (312). Specifying the usage model may include defining usage formally in terms of transformational vector (314).

The UDL specification of the usage model may relate the described usages to business object models and/or business process models underlying the business application. However, the usage model may be agnostic to the user interface technology available on the particular computing platform or device on which the business application is hosted and may not contain any specific UI notations.

Method 300 may further include providing a UDL-UI adapter configured to automatically convert or translate the usage model in the business application to a UI profile consistent with the UI technology available on the particular computing platform or device on which the business application is hosted (320). The UDL-UI adapter may be customized for the UI technology available on the particular computing platform or device on which the business application is hosted. Method 300 may include using the customized UDL-UI adapter to generate a UI instance on a frontend of the business application, which UI instance uses UI components or elements that are specifically supported by particular computing platform or device on which the business application is hosted (330). For example, if the particular platform or device supports a graphical user interface (GUI), the UI instance generated at the frontend of the business application may include GUI elements such as drop down menus, radio buttons, text entry fields, etc. Conversely, if the particular platform or device supports a voice user interface (VUI), the UI instance generated at the frontend of the business application may include VUI elements such as voice prompts.

A non-transitory computer readable medium may bear instructions capable of being executed on a processor, which instructions when executed may allow creation of a UI instance on a frontend of a business application hosted on a particular computing platform or device. The UI instance may use UI components or elements that are specifically supported by particular computing platform or device on which the business application is hosted. The business application may include a specification of a usage model which models anticipated usage of the business application by a user. The usage model may be specified in a machine-readable Usage Description Language (UDL). The usage model specification in the business application may not include references to specific UI elements or components and may be agnostic to the UI technology of the particular computing platform or device on which the business application is hosted.

The instructions on the non-transitory computer readable medium when executed may convert or translate the usage model in the business application to a UI profile, which includes UI components, or elements that are specifically supported by particular computing platform or device on which the business application is hosted.

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system, comprising:
a memory storing instructions; and
a processor configured to run an application, the application including an adapter coupled to a usage model describing at least one anticipated usage of the application by a user, wherein the processor is further configured to execute the instructions to cause the computer system to at least:
specify the usage model in a formal machine readable language, the formal machine readable language including at least one usage constraint configured to limit the at least one anticipated usage, the formal machine readable language further including usage notations distinctive from user interface notations referencing user interface elements of a computing device on which the application is hosted, wherein the at least one anticipated usage is formally defined in the usage model in terms of a transformational vector,
provide the adapter that is coupled to the usage model and that is further coupled to the user interface, the adapter translates, based on a user interface technology of the computer device hosting the application, the usage notations into user interface notations that are specific to the user interface technology of the computing device on which the application is hosted, the adapter comprising an abstraction layer configured to map the usage notation of the usage model into user interface instances, and
generate, based on the user interface notations translated by the adapter, a user interface instance on a display of the computing device,
wherein the usage model is stored at least partially in the memory, and
wherein the usage model in the machine readable language is agnostic to the user interface technology of the computing device on which the application is hosted.

2. The computer system of claim 1, wherein the adapter is customized for the user interface technology of the computing device on which the application is hosted.

3. The computer system of claim 1, wherein machine readable language includes language varieties which are tailored toward specific usage paradigms and/or usage contexts.

4. The computer system of claim 1, wherein the adapter is customized for the user interface technology of the computing device on which the application is hosted.

5. The computer system of claim 1, wherein machine readable language includes language varieties which are tailored toward specific usage paradigms and/or usage contexts.

6. The computer system of claim 1, wherein the formal machine readable language provides placeholders for at least one linkage of the usage notations to other notations.

7. The computer system of claim 1, wherein the abstraction. layer is further configured to express at least one user interface profile in technical terms for automated instantiation of the user interface.

8. A non-transitory computer readable medium comprising instructions that when executed by a processor cause a computing device to at least:
create a user interface instance on a frontend of an application hosted on a computing device, wherein the application includes an adapter coupled to a usage model which models at least one anticipated usage of the application by a user and the user interface instance includes user interface elements that are specifically supported by the computing device on which the application is hosted;

specify the usage model in a formal machine readable language, the formal machine readable language including at least one usage constraint configured to limit the at least one anticipated usage, the formal machine readable language further including usage notations distinctive from user interface notations referencing the user interface elements of the computing device on which the application is hosted, wherein the at least one anticipated usage is formally defined in the usage model in terms of a transformational vector; and provide the adapter that is coupled to the usage model and that is further coupled to the user interface, the adapter translates, based on a user interface technology of the computing device hosting the application, the usage notations into user interface notations that are specific to the user interface technology of the computing device, the adapter comprising an abstraction layer configured to map the usage notation of the usage model into user interface instances, wherein the created user interface instance is based on the translated user interface notations, wherein the usage model is coded in a formal-machine readable language that excludes user interface notations referencing any of the user interface elements of the computing device on which the application is hosted, wherein the at least one anticipated usage is formally defined in the usage model in terms of a transformational vector, wherein the usage model in the application is agnostic to a user interface technology of the computing.

9. The non-transitory computer readable medium of claim 8, wherein the usage model is specified in a machine-readable Usage Description Language.

10. The non-transitory computer readable medium of claim 8, wherein the adapter is customized for the user interface technology of the computing device.

11. The non-transitory computer readable medium of claim 8, wherein machine readable language includes language varieties which are tailored toward specific usage paradigms and/or usage contexts.

12. The non-transitory computer readable medium of claim 8, wherein specifying the usage model using a formal machine readable language includes defining usage formally in terms of a transformational vector.

13. The non-transitory computer readable medium of claim 8, wherein specifying the usage model using a formal machine readable language includes relating the anticipated usages to objects and/or process models underlying the application.

14. The non-transitory computer readable medium of claim 8, wherein the adapter to generates the user interface instance on a frontend of the application, and wherein the user interface instance uses user interface elements that are specifically supported by computing device on which the application is hosted.

15. A computer-implemented method comprising:

incorporating, by at least one processor, a usage model included in an application hosted on a computing device, the usage model describing at least one anticipated usage of the application by a user, the application including an adapter coupled to the usage model;

specifying, by the at least one processor, the usage model in a formal machine readable language, the formal machine readable language including at least one usage constraint configured to limit the at least one anticipated usage, the formal machine readable language further including usage notations distinctive from user interface notations referencing user interface elements of the computing device on which the application is hosted, wherein the at least one anticipated usage is formally defined in the usage model in terms of a transformational vector;

providing, by the at least one processor, the adapter that is coupled to the usage model and that is further coupled to the user interface, the adapter translates, based on a user interface technology of the computing device hosting the application, the usage notations into user interface notations associated with the user interface technology available on the computing device on which the application is hosted, the adapter comprising an abstraction layer configured to map the usage notation of the usage model into user interface instances; and generating, by the at least one processor and based on the user interface notations translated by the adapter, a user interface on a display of the computing device, wherein the usage model is agnostic to the user interface technology available on the computing device.

16. The method of claim 15, wherein specifying the usage model using a formal machine readable language includes relating the anticipated usages to objects and/or process models underlying the application.

17. The method of claim 15, wherein adapter is customized for the user interface technology available on the computing device on which the application is hosted.

18. The method of claim 17, further comprising, using the adapter to generate a user interface instance on a frontend of the application, wherein the user interface instance elements that are specifically supported by computing device on which the application is hosted.

* * * * *